United States Patent
Rishel

[11] 3,804,252
[45] Apr. 16, 1974

[54] PROCESS AND APPARATUS FOR THE SEPARATION OF LIQUID MIXTURES

[76] Inventor: Richard C. Rishel, 414 Defiance Ave., Findlay, Ohio 45840

[22] Filed: Jan. 3, 1972

[21] Appl. No.: 214,674

[52] U.S. Cl. .................................. 210/84, 210/532
[51] Int. Cl. ............................................ B01d 17/02
[58] Field of Search ............... 55/45, 171, 174, 176; 210/83, 84, 513, 532

[56] References Cited
UNITED STATES PATENTS

| | | | |
|---|---|---|---|
| 2,937,503 | 5/1960 | Swearingen et al. | 55/174 X |
| 3,043,072 | 7/1962 | Walker et al. | 55/176 X |
| 3,255,574 | 6/1966 | Glasgow | 55/176 X |
| 3,394,530 | 7/1968 | O'Neill et al. | 55/174 X |

*Primary Examiner*—Samih N. Zaharna
*Assistant Examiner*—Richard W. Burks

[57] ABSTRACT

The present invention relates to the separation of liquids of different specific gravities and to apparatus therefor, comprising, preferably, a horizontal cylindrical tank divided into compartments, into one of which the mixture to be separated is introduced and in which the mixture separates into its individual components which form distinct layers, the upper, lighter layer flowing over a wier into a second compartment from which it is removed as desired, and the heavier, lower layer entering, at a point remote from the inlet of said mixture into said first compartment, into a conduit which directs said heavier liquid through a hydraulic trap into a third compartment in which said heavier liquid is maintained at a level lower than that of the mixture of liquids in said initial settling compartment, and from which third compartment said heavier liquid is subsequently removed.

3 Claims, 1 Drawing Figure

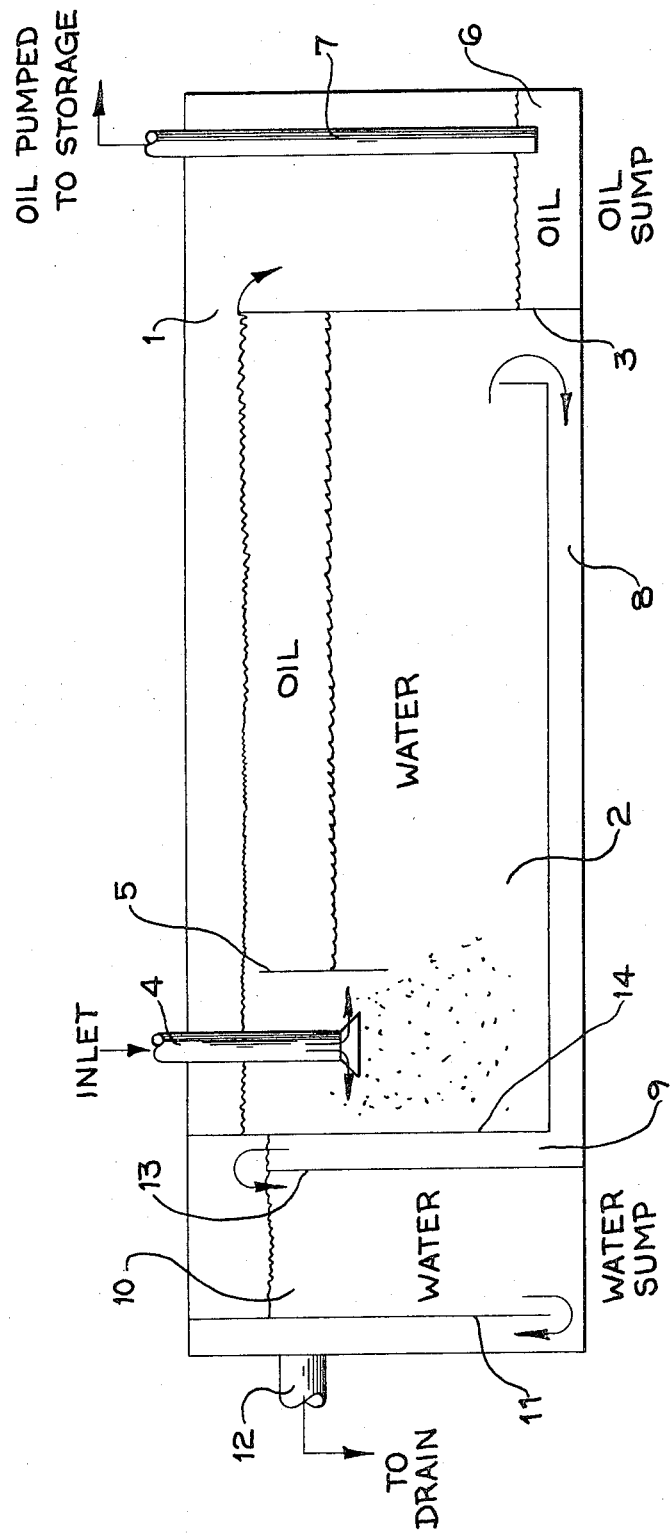

PROCESS AND APPARATUS FOR THE SEPARATION OF LIQUID MIXTURES

The present invention relates to the separation of liquids of different specific gravities, and to suitable apparatus therefor. More specifically, it relates to the separation of oil-water mixtures, and to apparatus suitable therefor.

The necessity for the separation of mixtures of liquids of different specific gravities is frequently encountered in industry. This is particularly the case in the petroleum industry where the recovery of oil often becomes necessary as a result of oil spills resulting from, but not limited to, petroleum terminal operations where spills can result from the loading of truck transports. The surface area on which petroleum products may accidently fall is controlled by suitable conventional drainage structures and any liquid falling onto this surface is conducted into the separator system. The effluent from this drainage area may consist of petroleum products, run-off from natural precipitation, or water resulting from the intentional flushing operation used to remove the potentionally dangerous film of petroleum products remaining on the surface. Comparatively large spills in the mangitude of several thousands of gallons can and have been encountered in this particular segment of industry and the failure to recover or suitably dispose of even the lesser spills of petroleum products will constitute a serious and dangerous pollution problem.

Many types of equipment and processes have been suggested in the past for the separation of liquid mixtures. Basically, most of these have involved the separation of the liquids by gravity while flowing through a zone of reduced velocity, followed by draining or skimming one of the separated liquids from the other. Most of these prior processes have been subject to various disadvantages. This has been particularly the case where it has not been possible or practical to introduce into the separator a constant flow of liquids of relatively constant composition. Most of such prior devices have been found to be wholly impractical when surges of mixtures of varying composition were introduced into the separator and close supervision was required for even relatively satisfactory operation. Such disadvantages of the prior art devices and processes are largely overcome by following the teachings of the present invention which is not only less expensive to install and operate, but at the same time provides more effective separation.

The device and process of the present invention can be suitably employed for the separation of mixtures of any two liquids of different specific gravities and is particularly suitable for the separation of oil-water mixtures for which it is hereinafter specifically described. It will be understood, therefore, that when other mixtures are being treated the lighter liquid functions as the oil and the heavier liquid as the water in the description which follows.

According to the present invention, the separator for liquid mixtures such as oil-water mixtures preferably comprises a horizontal cylindrical tank, which may be partially or totally submerged in the ground, primarily for the purpose of preventing the system from becoming inoperative by reason of freezing of the water or other liquid component of the system. This, however, is optional. The separator tank is preferably divided into a large middle settling compartment, or quiescent zone, into which the oil-water mixture is introduced in a manner so as to minimize the effect of turbulence, a first end compartment into which the separated oil layer flows over a wier of regulated height and from which the oil may be removed by pumps or other suitable means, and a second end compartment into which the separated heavy water layer flows through a conduit opening at a point remote from the point of entry of the liquid mixture and running along a major portion of the middle compartment near the bottom of said compartment. The lower water layer passes through this conduit and up through a hydraulic trap into the top of the water sump or second end compartment where the level of the water is maintained below the upper level of the liquid in the middle or separating compartment.

The formation of turbulence in the settling compartment caused by the introduction of the oil-water mixture may be reduced in different ways. An effective method of doing this has been found by placing a splash plate across the bottom of the inlet conduit, with the result that the liquid flow to the entrance zone is deflected horizontally into the settling zone. Turbulence may be further reduced by locating the inlet pipe toward one end wall of the compartment and placing a baffle plate on the opposite side of the inlet pipe. Such an arrangement further diffuses the horizontal flow of the liquid effusing from the inlet pipe.

The size of the separator is determined by the particular use. Where it is designed to take care of the spill from a ruptured transport tank a convenient size is a 10,000 gallon tank with the overflow wier positioned to permit an emergency displacement capacity of approximately 6,800 gallons.

The attached FIGURE shows a schematic diagram of the separator in operation, showing the oil-water interface and the flow pattern of the separator, as well as the arrangement of the various baffle and wier plates. It should be understood, however, that the location of the various compartments shown therein can be altered, including the discharge of the heavier, or water, layer from the separating compartment or quiescent zone. For example, in the FIGURE the water sump can be located beyond the oil sump and the water conduit from the separation zone can pass underneath or around the oil sump, the critical feature being that the wiers and baffles be arranged so that the water passes through a hydraulic trap which maintains the water level in the water sump below the upper liquid level in the settling compartment. The FIGURE shown represents one of the most suitable forms of separator from a design point of view.

The separator is preferably put into operation with the separation or quiescent zone 2 of the separator tank 1 filled with water (heavier liquid) to the top of the overflow wier 3. The oil-water mixture to be separated is introduced into the separator through the inlet 4 into the quiescent zone 2 where the oil and water components separate and the oil passes around the baffle 5 and forms a layer on top of the water and eventually decants over the wier 3 into the oil sump 6 from which it is removed to storage through the pipe 7 by pumps or other suitable means (not shown). Before the oil can decant over the wier 3 into the oil sump 6 it will displace water through the conduit 8 and hydraulic trap 9 into the top of the water sump 10 from which the water flows under baffle 11 and out of the separator through the outlet 12 to the drain. Eventually the separator stabilizes at the liquid levels indicated in the FIGURE. This condition represents equilibrium in the system and to which the system will, under any condition of loading, always tend to return with the introduction of oil-water mixtures. The difference in the heights in the wier plates 3 and 13 regulates the depth of the oil-water interface within the separator. Preferably, this difference will be approximately 4 inches for most applications of this separator. However, other differences in wier heights may be assigned for special operating conditions.

In the event that for any reason the oil is not removed from the oil sump and accumulates in the separator, the oil accumulation will eventually completely displace the water ballast before reducing the ability of the separator to function. However, when the amount of oil in the oil sump is reduced to and maintained at a level lower than the top of the wier 3 equilibrium in the separator is again established with the introduction of water into the separator which will displace the oil and decant the same over the wier 3 until the system is again stabilized to its natural state of equilibrium dictated by the differential wier heights. It will be evident, therefore, that a critical feature of this separator and separation system resides in the removal of the water from the system through the hydraulic trap formed by the wier 13 and baffle 14 which establishes the buffering capacity in the system for receiving unusually large spills of either water or oil without violating the purpose of the system. This feature permits the introduction into the separator of fairly large spills even when the means for removal of oil from the oil sump becomes temporarily inoperative. A large surge flow entering the separator merely displaces an equal volume of water through the hydraulic trap. Equilibrium in the separator can then readily be reestablished by introducing water into the separator to displace excess oil into the oil sump, from which it can be transferred to storage.

While a separator such as described above can be used for both continuous and intermittent operation, it is particularly suited for intermittent and comparatively infrequent product spills characteristic of refined products terminals and bulk petroleum plants, the displacement principle taking advantage of the time lapse between spills to maintain a high purity of separated liquids within the separator which are to be displaced by subsequent charges.

What is claimed is:

1. Apparatus suitable for separating mixtures of immiscible liquids of different specific gravities introduced intermittantly thereinto, comprising a horizontal tank divided into compartments, a liquid inlet conduit to a larger middle compartment and positioned to discharge below the upper level of of the heavier liquid in said compartment, means attached to the said liquid inlet for reducing turbulence and inducing horizontal flow to the liquid mixtures introduced into said middle compartment through said liquid inlet, an overflow wier positioned longitudinally opposite said inlet conduit and extending above the exit point of said liquid inlet and forming a separate end compartment, means for removing liquid from said end compartment, a third compartment containing a baffle extending from near the bottom of said third compartment and forming a conduit for the delivery of liquid from near the bottom of said third compartment up to a liquid outlet, a conduit leading along the bottom of said larger middle compartment and having its inlet at a point most remote from the said liquid inlet into said middle compartment, and said conduit leading through a hydraulic trap into the top portion of said third compartment, said hydraulic trap being so positioned to maintain the liquid level in said third compartment below the liquid level in said middle compartment, and means for removing liquid from said third compartment.

2. Apparatus according to claim 1, wherein said means for reducing turbulence comrises a downwardly extending conduit connected to said inlet and through which the liquid mixture to be separated is directed as it enters said middle compartment discharging below the upper level of the heavier liquid, a baffle plate across the bottom of said inlet conduit to induce horizontal flow of the influent, and a baffle plate located longitudinally opposite the bottom of the said inlet conduit and opposite from the wall of said compartment.

3. Process for the separation of mixtures of immiscible liquids of different specific gravities, comprising introducing said mixture of liquids into a first compartment zone of quiescent liquid, permitting separation of said liquids in said quiescent zone and the formation of upper and lower layers of said liquids, permitting the upper lighter layer of liquid to decant into a second compartment, passing said heavier lower layer of liquid through a conduit leading from the lower portion of said quiescent zone at a point opposite the point at which said liquid mixture is introduced into said quiescent zone and leading said heavier liquid through a hydraulic trap into the top of a third compartment from the lower portion of which said heavier liquid is withdrawn through a wier-controlled outlet positioned to maintain the liquid surface in said third compartment below the liquid surface in said quiescent zone, and removing said heavier liquid from said third compartment and said lighter liquid from said second compartment.

* * * * *